(12) United States Patent
Choi

(10) Patent No.: US 10,449,953 B2
(45) Date of Patent: Oct. 22, 2019

(54) APPARATUS AND METHOD FOR CONTROLLING POWER GENERATION IN A VEHICLE

(71) Applicants: Hyundai Motor Company, Seoul (KR); Kia Motors Corporation, Seoul (KR)

(72) Inventor: Kwang-Seok Choi, Whasung-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 208 days.

(21) Appl. No.: 15/810,642

(22) Filed: Nov. 13, 2017

(65) Prior Publication Data

US 2018/0170362 A1 Jun. 21, 2018

(30) Foreign Application Priority Data

Dec. 16, 2016 (KR) .................. 10-2016-0172400

(51) Int. Cl.
*B60W 20/00* (2016.01)
*B60W 20/50* (2016.01)
*F02N 11/08* (2006.01)
*F02N 11/10* (2006.01)
*B60W 10/06* (2006.01)
*B60W 10/08* (2006.01)
(Continued)

(52) U.S. Cl.
CPC ............ *B60W 20/50* (2013.01); *B60W 10/06* (2013.01); *B60W 10/08* (2013.01); *B60W 20/13* (2016.01); *F02N 11/04* (2013.01); *F02N 11/0866* (2013.01); *F02N 11/108* (2013.01); *B60W 2510/085* (2013.01); *B60W 2510/244* (2013.01); *B60W 2510/30* (2013.01); *B60W 2710/086* (2013.01); *B60W 2710/244* (2013.01); *B60W 2710/30* (2013.01); *F02N 2200/061* (2013.01); *Y10S 903/93* (2013.01)

(58) Field of Classification Search
USPC .......................................................... 701/22
See application file for complete search history.

(56) References Cited

U.S. PATENT DOCUMENTS

2002/0100836 A1* 8/2002 Hunt .................. B63G 8/08
244/50
2005/0101432 A1* 5/2005 Pels ................... B60W 20/30
477/5
(Continued)

FOREIGN PATENT DOCUMENTS

KR 10-2005-0045591 A 5/2005
KR 10-2013-0136780 A 12/2013

*Primary Examiner* — Masud Ahmed
(74) *Attorney, Agent, or Firm* — Morgan, Lewis & Bockius LLP

(57) ABSTRACT

An apparatus for controlling power generation in a vehicle may include an engine, a motor connected to a crankshaft of the engine by a connecting device to generate power, a main battery supplying power to the motor, a controller diagnosing a failure of the main battery and generating a reverse output control command to reversely supply seed power for prefluxing the motor to the main battery when the failure occurs, an auxiliary battery outputting the seed power according to the reverse output control command, and a converter regulating the seed power according to the reverse output control command and supplying the regulated seed power to the motor.

20 Claims, 3 Drawing Sheets

(51) Int. Cl.
 *B60W 20/13* (2016.01)
 *F02N 11/04* (2006.01)

(56) References Cited

U.S. PATENT DOCUMENTS

| | | | |
|---|---|---|---|
| 2011/0095603 A1* | 4/2011 | Lee | B60L 50/51 |
| | | | 307/10.1 |
| 2014/0195078 A1* | 7/2014 | Severinsky | B60H 1/004 |
| | | | 701/22 |
| 2015/0038288 A1* | 2/2015 | Holmes | B60K 6/387 |
| | | | 477/5 |
| 2015/0158373 A1* | 6/2015 | Conlon | B60K 6/42 |
| | | | 701/22 |
| 2016/0229393 A1* | 8/2016 | McCullough | B60W 20/30 |
| 2018/0072158 A1* | 3/2018 | Yang | B60K 6/48 |
| 2018/0162374 A1* | 6/2018 | Colavincenzo | B60W 20/40 |

* cited by examiner

APPARATUS AND METHOD FOR CONTROLLING POWER GENERATION IN A VEHICLE

CROSS-REFERENCE(S) TO RELATED APPLICATIONS

The present application claims priority to Korean Patent Application No. 10-2016-0172400 filed on Dec. 16, 2016, the entire contents of which is incorporated herein for all purposes by this reference.

BACKGROUND OF THE INVENTION

Field of the Invention

The present invention relates to a limphome control technology, and more particularly, to an apparatus and a method for controlling power generation in a vehicle configured for preventing a situation where a vehicle may not be driven due to a failure of a main battery and normally driving the vehicle with an engine.

Description of Related Art

Generally, in the case of a hybrid vehicle, a power shortage ultimately requires an increase in capacity of an alternator and a battery. Therefore, an increase in the number of wirings/harnesses and/or an increase in a weight of the vehicle is essentially involved.

Generally, a maximum power capacity (up to about 2.5 kW) that may be supplied by an auxiliary battery (e.g., output voltage of about 12 V) that supplies power to electrical loads or the like may be limited.

However, with the extending application of new technology parts development as internal factors, electric consumption is increasing. In addition, as external factors, fuel economy and exhaust gas regulations need to be tightened or convenience of driving needs to be improved.

Therefore, when more power than that provided by the auxiliary battery is required, besides the auxiliary battery, a main battery having a different power source system (e.g., output voltage of about 41V, 48V, etc.) is used.

A vehicle having the structure is called a mild-hybrid electric vehicle (Mild-HEV) or a soft-HEV.

However, unlike a motor applied to a full HEV, a motor applied to the Mild-HEV has a structure in which a rotor type is made up of a permanent magnet type and an electromagnet. Therefore, a separate excitation current needs to flow in the motor to drive the motor to preflux the rotor, performing torque assist and power generation operations.

When the main battery fails, the excitation current may not be supplied, and when the excitation current is not supplied, the motor power generation operation may not be performed. Accordingly, when the auxiliary battery keeps a charging impossible state and the auxiliary battery is discharged, an operation of an electric load using power of the auxiliary battery stops and the vehicle may not move any more.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling power generation in a vehicle configured for preventing a situation where a vehicle may not be driven due to a failure of a main battery.

Various aspects of the present invention are directed to providing an apparatus and a method for controlling power generation in a vehicle configured for normally driving the vehicle with an engine even when a main battery fails.

Various aspects of the present invention are directed to providing an apparatus and a method for controlling power generation in a vehicle that may correspond to an electrical load and/or charge an auxiliary battery even when the main battery fails.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

Various aspects of the present invention are directed to providing an apparatus for controlling power generation in a vehicle configured for preventing a situation where a vehicle may not be driven due to a failure of a main battery.

In accordance with various exemplary embodiments of the present invention, an apparatus for controlling power generation in a vehicle may include an engine; a motor connected to a crankshaft of the engine by a connecting device to generate power; a main battery supplying power to the motor; a controller diagnosing a failure of the main battery and generating a reverse output control command to reversely supply seed power for prefluxing the motor to the main battery when the failure occurs; an auxiliary battery outputting the seed power according to the reverse output control command; and a converter regulating the seed power according to the reverse output control command and supplying the regulated seed power to the motor.

The vehicle control device may include: a diagnostic module diagnosing the failure of the main battery to generate diagnostic information; a determination module determining whether the failure occurs using the diagnostic information; and a prefluxing module generating a reverse output control command supplying the seed power for prefluxing the motor when the failure occurs.

The controller may further include a control module performing a limphome control mode limiting the output of the engine when a state of charge of the auxiliary battery is less than a predetermined reference value.

The apparatus may further include: a service lamp displaying the limphome control mode.

The seed power may be a current initially prefluxing an electromagnet of the motor.

The connecting device may be a belt.

The main battery may be a super capacitor or a lithium ion battery and the auxiliary battery may be a lead acid battery.

The failure may be at least any one of a communication fault between the main battery and a battery management system (BMS), a fault of the main battery itself, and a fail of a battery which is in an off state of the main relay.

The converter may regulate an output voltage from the main battery according to a forward output control command and supply the regulated output voltage to the auxiliary battery.

The motor may be an inverter integrated mild hybrid starter and generator (MHSG).

In accordance with various exemplary embodiments of the present invention, a method for controlling limphome may include supplying, by a main battery, power to a motor; diagnosing, by a controller, a failure of the main battery and generating a reverse output control command to reversely supply seed power for prefluxing the motor to the main battery when it is determined as the diagnostic result that the failure occurs; outputting, by an auxiliary battery, the seed power according to the reverse output control command and regulating, by a converter, the seed power and supplying the regulated seed power to the motor; and performing, by the motor connected to a crankshaft of an engine by a connecting device, power generation.

The generating of the reverse output control command may include: diagnosing, by a diagnostic module, a failure of the main battery to generate diagnostic information; determining, by a determination module, whether the failure occurs using the diagnostic information; and generating, by a prefluxing module, a reverse output control command supplying the seed power for prefluxing the motor when the failure occurs.

The method may further include: comparing, by the controller, a state of charge of the auxiliary battery with a predetermined reference value; and performing, by the control module, a limphome control mode limiting an output of the engine when it is determined as the comparison result that the state of charge of the auxiliary battery is less than the reference value.

The method may further include: displaying the limphome control mode by turning on a service lamp.

The performing of the power generation may include regulating, by a converter, an output voltage from the main battery according to a forward output control command and supplying the regulated output voltage to the auxiliary battery.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
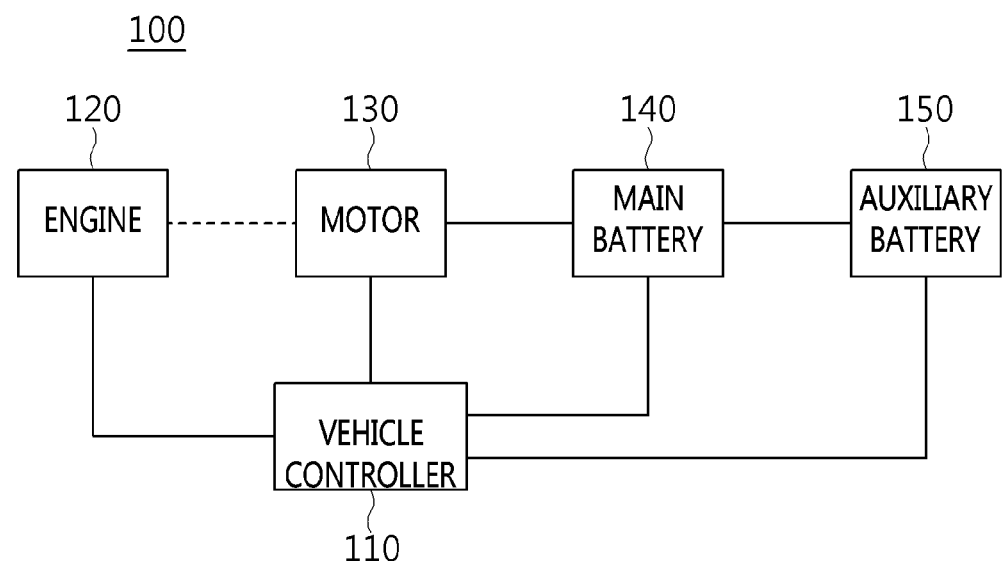
FIG. 1 is a configuration block diagram of an apparatus for controlling power generation in a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention.

Throughout the accompanying drawings, the same reference numerals will be used to describe the same components. Terms used in the specification, 'first', 'second', etc. can be used to describe various components, but the components are not to be construed as being limited to the terms. The terms are only used to differentiate one component from other components.

For example, the 'first' component may be named the 'second' component and the 'second' component may also be similarly named the 'first' component, without departing from the scope of the present invention. The term 'and/or' includes a combination of a plurality of items or any one of a plurality of terms.

Unless defined otherwise, it is to be understood that all the terms used in the specification including technical and scientific terms have the same meaning as those that are generally understood by those who skilled in the art to which the present invention pertains.

It must be understood that the terms defined by the dictionary are identical with the meanings within the context of the related art, and they should not be ideally or excessively formally defined unless the context clearly dictates otherwise.

Hereinafter, an apparatus and a method for controlling power generation in a vehicle according to an exemplary embodiment of the present invention will be described in detail with reference to the accompanying drawings.

FIG. 1 is a configuration block diagram of an apparatus 100 for controlling power generation in a vehicle according to an exemplary embodiment of the present invention. Referring to FIG. 1, the apparatus 100 for controlling power generation in a vehicle may be configured to include a controller 110 exchanging and controlling signals and data between components disposed in the vehicle, an engine 120, a motor 130 connected to a crankshaft of the engine 120 by a connecting device to generate electricity, a main battery 140 supplying power to the motor 130, an auxiliary battery 150 supplying seed power for initial driving of the motor 130 when the main battery 140 fails, or the like.

The controller 110 is configured to diagnose a failure of the main battery 140 and generate a power generation control command to supply the seed power for initial driving of the motor when the failure occurs.

The engine 120 may be continuous a variable valve timing (CVVT) engine, a double over head camshaft (DOHC) engine, a continuous valve timing (CVT) engine, a gasoline direct injection engine, and a multi-point injection (MPI) engine that use gasoline as fuel, a common rail direct injection (CRDI) engine, a high direction turbo intercooler (HTI) engine, and a variable geometry turbocharge (VGT) engine that use diesel as fuel, and a liquid propane injection (LPi) engine that utilizes gas as fuel, or the like.

The motor 130 may be an inverter integrated mild hybrid starter and generator (MHSG). In other words, the motor 130 may be configured to include an inverter function. Therefore, it is possible to convert generated power of the three-phase alternating current generated in the motor 130 into a direct current or conversely convert the direct current into the three-phase alternating current, driving the motor 130.

The motor 130 is made up of a permanent magnet type and an electromagnet, unlike a full hybrid electric vehicle (HEV) motor. That is, a stator or is made up of the permanent magnet type and a rotor or is made up of the electromagnet. Therefore, an excitation current for prefluxing the electromagnet of the rotor needs to flow in the motor 130 to drive the motor 130.

However, when the main battery 140 fails, the motor 130 may not receive the excitation current for prefluxing from the main battery 140. Therefore, when there is no excitation current, a power generation operation of the motor 130 may not be performed. In the instant case, the state in which the auxiliary battery 150 is not charged may be continued and the auxiliary battery 150 may be discharged. The operation of the electrical components of the vehicle stops and the vehicle may not move any more.

To solve the problem, the seed power (i.e., current) for initial prefluxing of the rotor is supplied from the auxiliary battery 150. Therefore, the power generation using the motor 130 may be performed. Hereinafter, power corresponding to an electrical load and required to drive the engine may be supplied by the continuous power generation of the motor 130.

In other words, when the main battery 140 fails, the auxiliary battery 150 may flow a separate excitation current into the motor 130 to preflux the rotor of the motor 130, perform the power generation operation. Of course, a torque assist operation as well as the power generation operation may be performed.

The engine 120 and the motor 130 are connected by a connecting device including a belt. Therefore, in the general operation mode, the motor 130 is not in the power generation state even when the engine 120 is driven. That is, only when the excitation current is applied to the motor 130, the rotor of the motor 130 is prefluxed to start power generation.

The main battery 140 may be a super capacitor or a lithium ion battery. In addition, the main battery 140 may be high-voltage batteries for electric vehicles including a nickel metal battery, a lithium polymer battery, and an all-solid battery. Furthermore, the main battery 140 may be a single battery cell or may be a battery pack in which the battery cells are configured in series and/or in parallel.

The battery cell may be designed to be a cylindrical cell, a prismatic cell, a pouched cell, or the like. The pouched cells include a flexible cover including a thin film, and the internal to the cover are provided with the electrical components of the battery cell.

The pouched cells are used to realize optimum space utilization within a single battery cell. The pouched cells have a low weight as well as high capacity.

Edge portions of the pouched cells include a sealing joint. In other words, the sealing joint connects two thin films of battery cells, and cavities of the thin films that are formed thereby include additional components.

The main battery 140 may have an output voltage of about 48 V, but is not limited thereto.

The auxiliary battery 150 may be a lead acid battery but is not limited thereto, and therefore may be a nickel metal battery, a lithium polymer battery, and a lithium ion battery.

The auxiliary battery 150 is charged with charging power supplied from the main battery 140. Furthermore, when the main battery 140 fails, the seed power (for example, about 12 V) is supplied to the motor 130 under the control of the controller 110.

The controller 110 diagnoses the components disposed in the vehicle and generates a reverse output control command to supply the seed power for initial driving of the motor 130 when it is determined as the diagnostic result that a failure associated with the main battery 140 occurs to control the auxiliary battery 150.

Also, the controller 110 may verify the state of charge of the auxiliary battery using auxiliary battery status information and perform a limphome control mode without performing a power generation control mode when the state of charge is small. Exemplary embodiments of the auxiliary battery status information may include a state of charge (SOC), a state of health (SOH), a depth of discharging (DOD), a state of function (SOF), or the like.

The engine 120 shown in FIG. 1 includes an engine controller, and the motor 130 also includes a motor controller.

Figure 2:
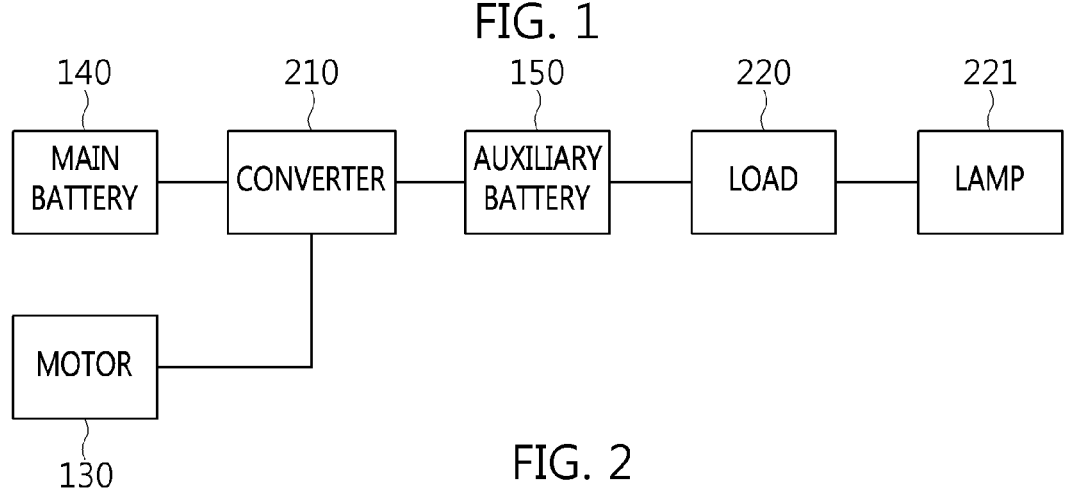
FIG. 2 is a block diagram showing a configuration in which a converter and an electrical load are included in the apparatus for controlling power generation in a vehicle shown in FIG. 1.

FIG. 2 is a block diagram showing a configuration in which a converter and an electrical load are included in the apparatus for controlling power generation in a vehicle shown in FIG. 1. Referring to FIG. 2, a converter 210 is provided between the main battery 140 and the auxiliary battery 150. The converter 210 which is a bidirectional converter performs bucking and boosting. In other words, when the main battery 140 is normal, a forward output control is performed. Accordingly, the output voltage from the main battery 140 is regulated and supplied to the auxiliary battery 150. For example, in the case of the forward output control, the converter 210 converts 48V into 12V and supplies 12V to the auxiliary battery 150.

On the other hand, when the main battery 140 fails, the reverse output control is performed. Therefore, the output voltage from the auxiliary battery 150 is regulated and supplied to the motor 130. For example, in the case of the reverse output control, the converter 210 converts 12V into 48V and supplies 48V to the motor 130.

Accordingly, the converter 210 may be a direct current direct current (DC-DC) converter as a bidirectional converter. The converter 210 may be a low voltage DC-DC (LDC) converter. Of course, the converter 210 includes a boost and buck circuit.

Meanwhile, the auxiliary battery 150 supplies power to the load 220. The load 220 may be electrical components including a lamp 221. The lamp 221 may be a service lamp for indicating when the limphome control mode is performed.

The motor 130 receives the seed power from the auxiliary battery 150 through the reverse output control to perform power generation when supplied with a current for initial prefluxing. Subsequently, the auxiliary battery 150 continuously supplies the seed power, and the motor 130 outputs more generated power than the seed power through the power generation and provides the generated power to the main battery 140 and/or the auxiliary battery 150. That is, the motor 130 generates more power than the excitation current supplied from the auxiliary battery 150.

Figure 3:
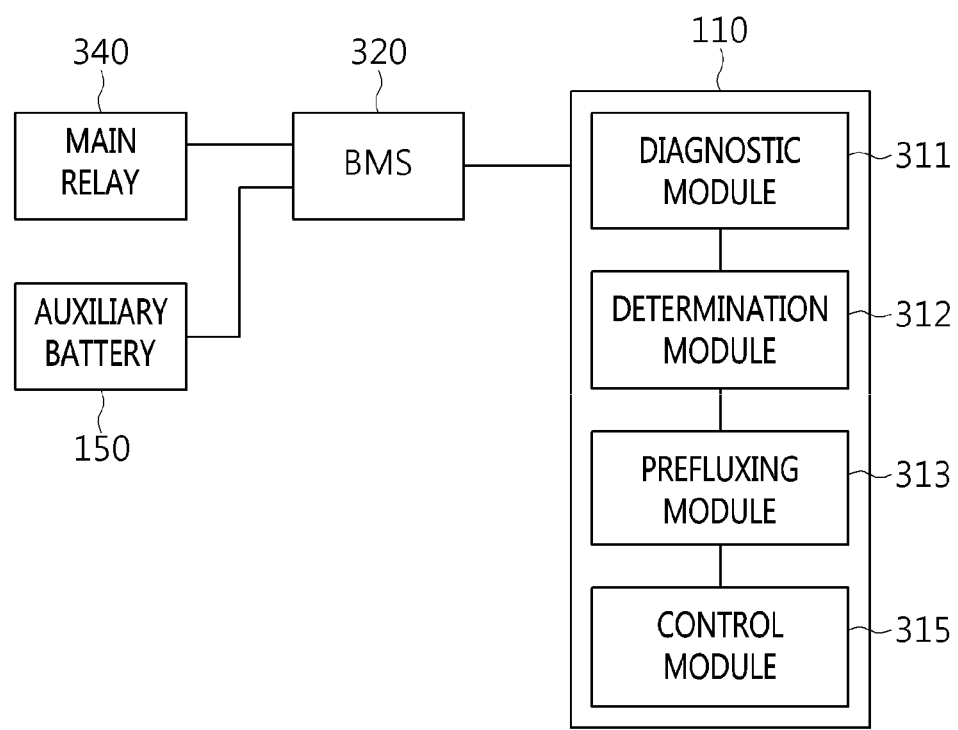
FIG. 3 is a detailed schematic diagram of the apparatus for controlling power generation in a vehicle shown in FIG. 1.

FIG. 3 is a detailed schematic diagram of the apparatus for controlling power generation in a vehicle shown in FIG. 1. Referring to FIG. 3, a main relay 340 for a switching operation may be configured between the motor (130 in FIG. 1) and the main battery 140. In addition, a battery management system 320 for managing the auxiliary battery 150 may be configured.

Of course, the BMS 320 may manage the main battery 140 and may collect the auxiliary battery status information related to the main battery 140 and transmit the collected auxiliary battery status information to the controller 110.

Furthermore, according to an exemplary embodiment of the present invention, for understanding, the BMS 320 is shown separate from the auxiliary battery and/or the main battery but may be configured in the auxiliary battery and/or the main battery.

The controller 110 includes a diagnostic module 311 diagnosing the failure of the main battery 140 to generate the diagnostic information, a determination module 312 determining whether the failure occurs using the diagnostic information, a prefluxing module 313 generating the power generation control command for supplying the seed power for the initial driving of the motor (130 of FIG. 1) when the failure occurs, and a control module 315 performing the limphome control mode for limiting the output of the engine when it is determined that the state of charge of the auxiliary battery is less than a predetermined reference value, or the like.

The diagnostic module 311 is configured to diagnose the failure of the main battery 140. That is, the problem with the function of the main battery 140 occurs, and thus power is not supplied to the motor 130, such that power generation may not be made. In other words, it is possible to diagnose faults including a communication fault between the main battery 140 and the BMS 320, a fault of the main battery itself, and a fail of a battery which is in an off state of the main relay 340, or the like.

Here, the communication fault refers to a state in which no communication is established between the main battery 140 and the BMS 320 as a controller area network (BMS CAN) time out situation. The main battery self fault corresponds to a case where the BMS 320 transmits a battery fault state due to the hardware and/or software fault of the main battery 140. Also, the battery fail refers to a case where the BMS 320 transmits the state in which the main relay 340 is off.

When it is determined that the main battery (140 in FIG. 1) is in the failure state and the state of charge (i.e., SOC) of the auxiliary battery 150 is less than the reference value, the control module 315 limits the output of the engine (120 in FIG. 1) to perform the lymph home control mode. Here, the output of the engine 120 includes an engine torque and revolution per minute (RPM).

Figure 4:
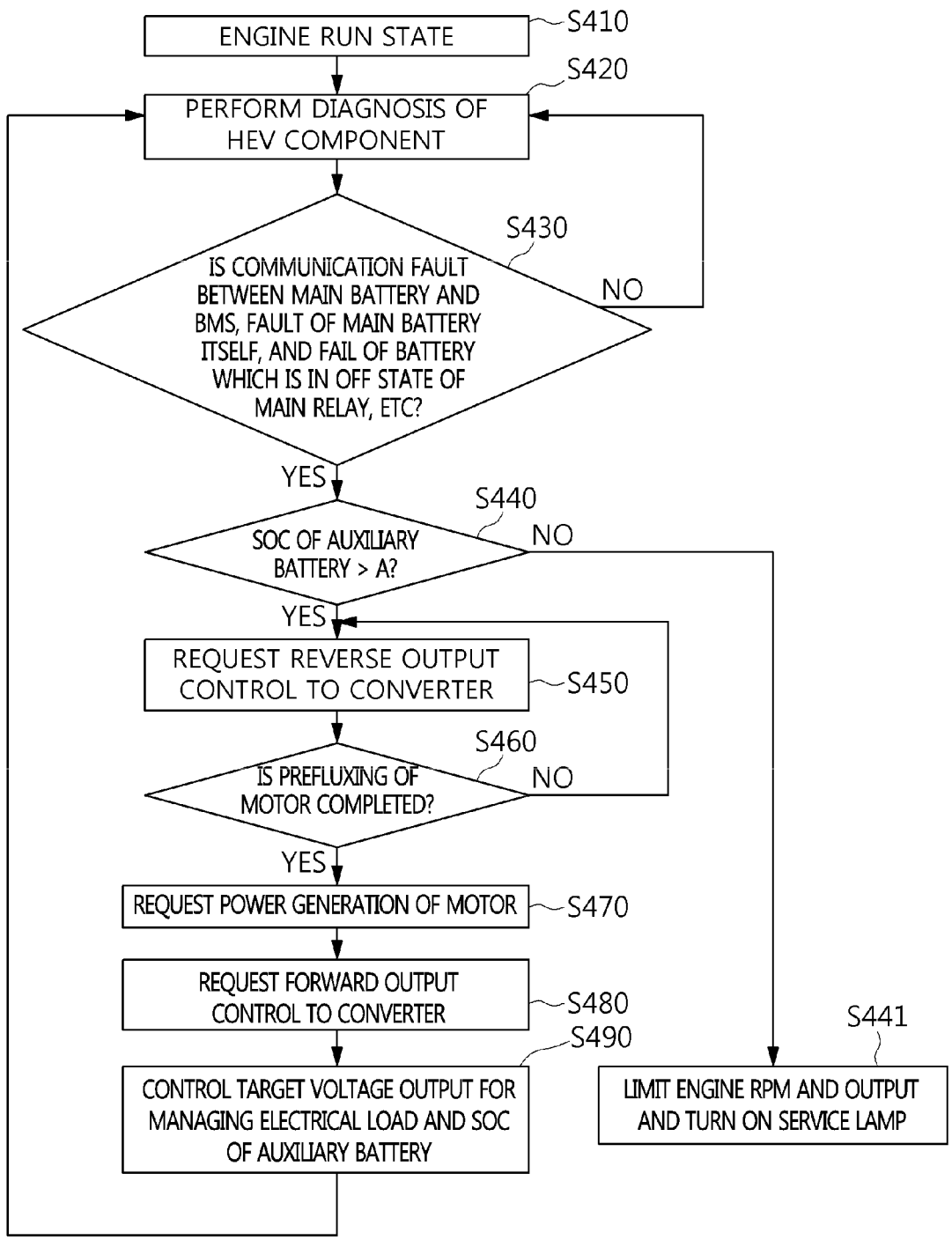
FIG. 4 is a flow chart illustrating a process of controlling a limphome according to an exemplary embodiment of the present invention.

FIG. 4 is a flow chart illustrating a process of controlling a limphome according to an exemplary embodiment of the present invention. Referring to FIG. 4, first, the engine (120 in FIG. 1) is in a run state in the normal operation mode of the vehicle. In the instant case, the main battery (140 in FIG. 1) is in the normal state and supplies power to the motor (130 in FIG. 1) and/or the auxiliary battery (150 in FIG. 1) (step S410).

In the normal state, the controller (110 in FIG. 1) diagnoses the components disposed in the vehicle to diagnose the failure of the main battery 140 to generate diagnostic information (step S420).

Thereafter, the controller 110 checks whether the failure occurs according to the diagnosis result of the diagnostic information (step S430). In other words, it is possible to verify whether there are faults including the communication fault between the main battery 140 and the BMS (320 in FIG. 3), the fault of the main battery itself, and the fail of the battery which is in the off state of the main relay 340, or the like.

As the check result, when it is determined in the step S430 that the failure occurs, it is checked whether the state of charge (SOC) of the auxiliary battery is greater than the predetermined reference value A (step S440).

As the check result, when it is determined in the step S440 that the state of charge (SOC) of the auxiliary battery is large, it is determined that the state of charge of the auxiliary battery is sufficient to generate the reverse output control command and request the reverse output control to the converter (210 in FIG. 2) (step S450). That is, the power supplied to the motor 130 is changed from the main battery 140 to the auxiliary battery 150, and the seed power for the initial driving is supplied to the motor 130.

Hereinafter, when the prefluxing of the motor 130 is completed, the power generation control command is generated and transmitted to the motor 130 to allow the motor 130 to perform the power generation (step S470).

Thereafter, when the motor 130 performs the power generation, a forward output control command is generated and a forward control is requested to the converter 210 to supply the charging power to the main battery 140 and/or the auxiliary battery 150. Of course, it is also possible to first supply the charging power to the main battery 140 and supply the charging power from the main battery 140 to the auxiliary battery 150 from (steps S480 and S490).

On the other hand, when the main battery 140 is not charged due to the failure, the charging power may be directly supplied to the auxiliary battery 150 through the converter 210. Of course, the auxiliary battery 150 continuously supplies power to the load 220.

On the other hand, when it is determined in the step S440 that the state of charge (SOC) of the auxiliary battery is less than the reference value A, the controller 110 performs the limphome control mode and turns on the lamp 221 (step S441). That is, since the auxiliary battery 150 has no sufficient state of charge, the output of the engine is limited and the lamp is turned on so that the driver can know the insufficient state of charge of the auxiliary battery 150.

According to the exemplary embodiment of the present invention, it is possible to drive the vehicle without reducing the driving performance of the vehicle even when the main battery fails.

Furthermore, it is possible to prevent the safety problem which is caused when the vehicle may not be driven suddenly.

In addition, it is possible to secure the safety of the functions using the fail safety technology and give the customer the awareness of the safe vehicle by maintaining the merchantability of the vehicle.

Moreover, it is possible to meet the electrical load and charge the auxiliary battery even when the battery fails.

Also, it is possible to secure the safety of the customer and inducing the repair by limiting the vehicle speed and the torque even when the main battery fails and the auxiliary battery is insufficient.

The terms "module", "controller" or the like, described in the specification device a device of processing at least one function or operation and may be implemented by hardware or software or a combination of hardware and software.

The hardware may be implemented as an application specific integrated circuit (ASIC), digital signal processing (DSP), a programmable logic device (PLD), a field programmable gate array (FPGA), a processor, a controller, a microprocessor, other electronic devices, or a combination thereof, all of which is designed to perform the above-mentioned functions. The software may be implemented as a module performing the above-mentioned functions. The software may be stored in a memory device and is executed by a processor. The memory device or the processor may adopt various devices that are known to those skilled in the art.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling power generation in a vehicle, comprising:
   an engine;
   a motor connected to a crankshaft of the engine by a connecting device to generate power;
   a main battery supplying power to the motor;
   a controller configured for diagnosing a failure of the main battery and generating a reverse output control command to reversely supply seed power for prefluxing the motor to the main battery when the failure occurs;
   an auxiliary battery outputting the seed power according to the reverse output control command; and
   a converter regulating the seed power according to the reverse output control command and supplying the regulated seed power to the motor.

2. The apparatus of claim 1, wherein the vehicle controller includes:
   a diagnosis module diagnosing the failure of the main battery to generate diagnostic information;
   a determination module determining whether the failure occurs using the diagnostic information; and
   a prefluxing module generating the reverse output control command supplying the seed power for prefluxing the motor when the failure occurs.

3. The apparatus of claim 2, wherein the controller further includes a control module performing a limphome control mode limiting an output of the engine when a state of charge of the auxiliary battery is less than a predetermined reference value.

4. The apparatus of claim 3, further including:
   a service lamp displaying the limphome control mode.

5. The apparatus of claim 1, wherein the seed power is a current initially prefluxing an electromagnet of the motor.

6. The apparatus of claim 1, wherein the connecting device is a belt.

7. The apparatus of claim 1, wherein the main battery is a super capacitor or a lithium ion battery and the auxiliary battery is a lead acid battery.

8. The apparatus of claim 1, wherein the failure is at least any one of a communication fault between the main battery and a battery management system (BMS), a fault of the main battery itself, and a failure of a battery which is in an off state of a main relay.

9. The apparatus of claim 1, wherein the converter regulates an output voltage from the main battery according to a forward output control command and supplies the regulated output voltage to the auxiliary battery.

10. The apparatus of claim 1, wherein the motor is an inverter integrated mild hybrid starter and generator (MHSG).

11. A method for controlling limphome, comprising:
    supplying, by a main battery, power to a motor;
    diagnosing, by a controller, a failure of the main battery and generating a reverse output control command to reversely supply seed power for prefluxing the motor to the main battery when the controller determines as the diagnosis result that the failure occurs;
    outputting, by an auxiliary battery, the seed power according to the reverse output control command and regulating, by a converter, the seed power and supplying the regulated seed power to the motor; and
    performing, by the motor connected to a crankshaft of an engine by a connecting device, power generation.

12. The method of claim 11, wherein the generating of the reverse output control command includes:
    diagnosing, by a diagnostic module, the failure of the main battery to generate diagnostic information;
    determining, by a determination module, whether the failure occurs using the diagnostic information; and
    generating, by a prefluxing module, a reverse output control command supplying the seed power for prefluxing the motor when the failure occurs.

13. The method of claim 12, further including:
    comparing, by the controller, a state of charge of the auxiliary battery with a predetermined reference value; and
    performing, by the control module, a limphome control mode limiting an output of the engine when it is determined as the comparison result that the state of charge of the auxiliary battery is less than the reference value.

14. The method of claim 13, further including:
    displaying the limphome control mode by turning on a service lamp.

15. The method of claim 11, wherein the seed power is a current initially prefluxing an electromagnet of the motor.

16. The method of claim 11, wherein the connecting device is a belt.

17. The method of claim 11, wherein the main battery is a super capacitor or a lithium ion battery and the auxiliary battery is a lead acid battery.

18. The method of claim 11, wherein the failure is at least any one of a communication fault between the main battery and a battery management system (BMS), a fault of the main battery itself, and a failure of a battery which is in an off state of a main relay.

19. The method of claim 11, wherein the performing of the power generation includes regulating, by a converter, an output voltage from the main battery according to a forward output control command and supplying the regulated output voltage to the auxiliary battery.

20. The method of claim 11, wherein the motor is an inverter integrated mild hybrid starter and generator (MHSG).

* * * * *